United States Patent Office 3,351,941
Patented Nov. 7, 1967

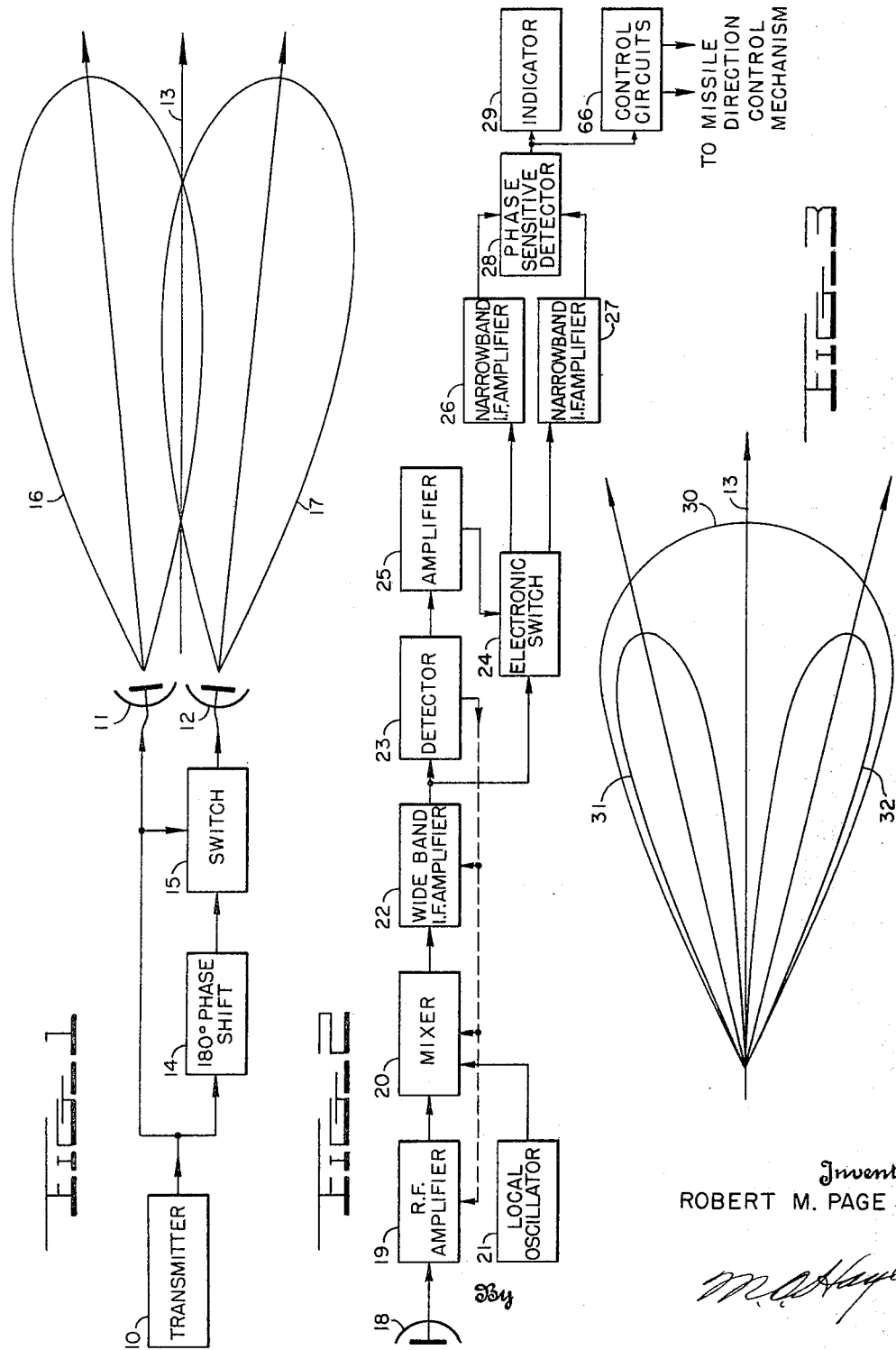

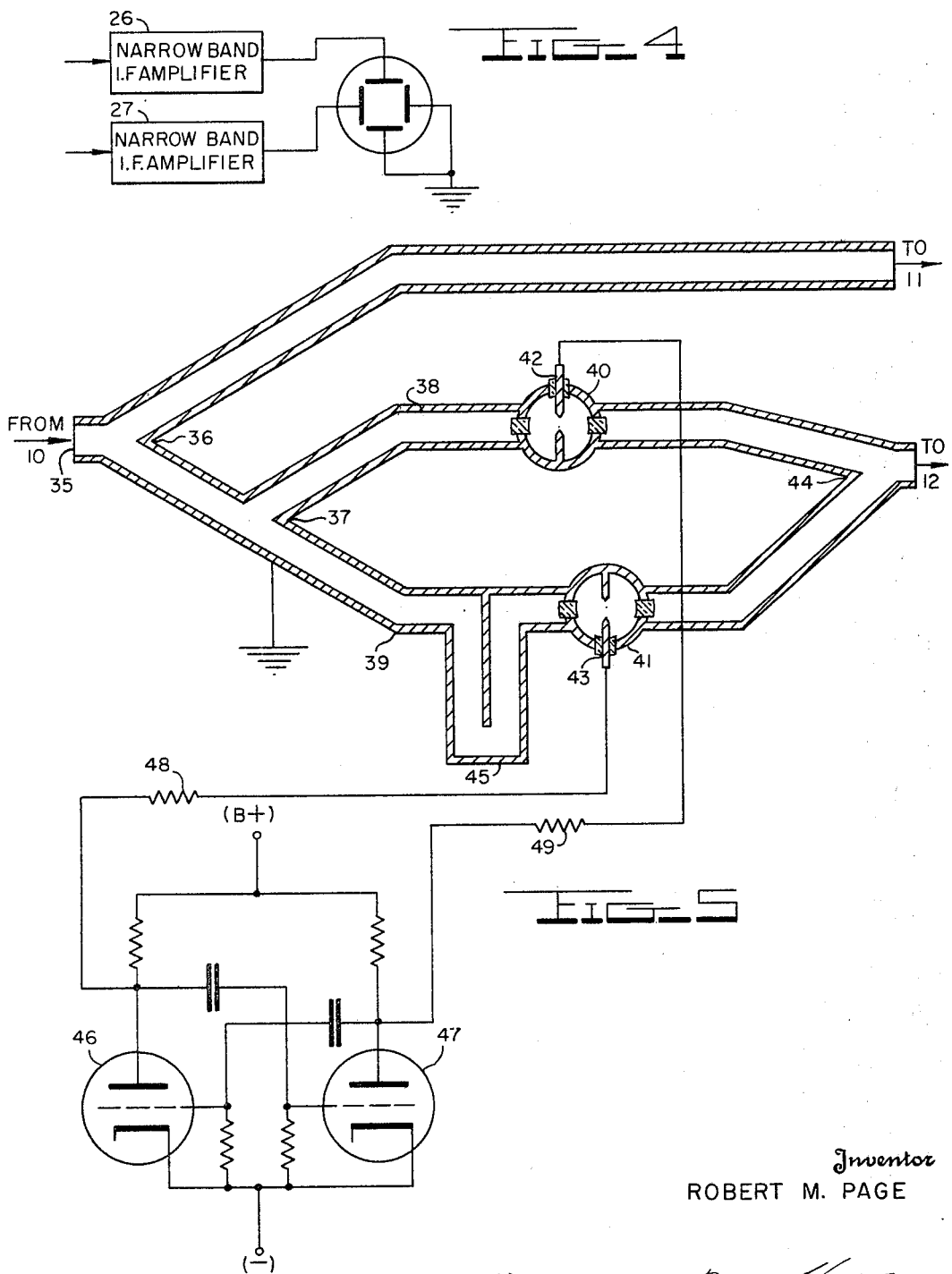

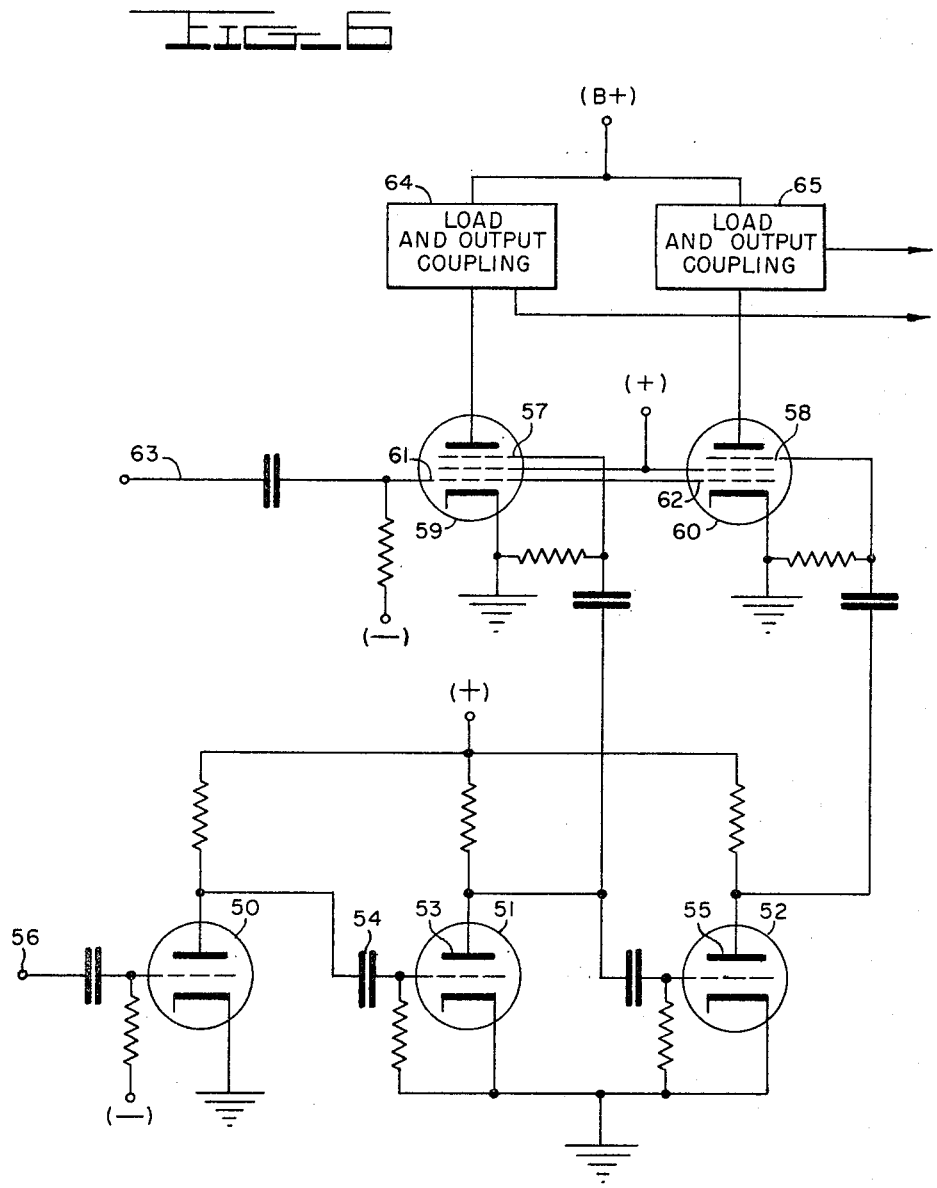

3,351,941
RADIO WAY-FOLLOWING SYSTEM
Robert M. Page, Camp Springs, Md.
(6715 Shay Lane, Paradise, Calif. 95969)
Filed Oct. 6, 1949, Ser. No. 119,983
10 Claims. (Cl. 343—107)

The invention described herein may be manufactured and used by or for the Government of the United States of America for governmental purposes without the payment of any royalties thereon or therefor.

This invention relates to radio direction finding systems of a type which can provide a measure of the position of one object with respect to the axis of a beam of energy emitted from a remote locality.

In many applications of control and location equipment it is desirable to obtain an indication of the position of an object at one locality with respect to a selected direction from another location. In particular an application may involve the determination of the position of a receiver with respect to the axis of directivity of a beam of radio frequency energy and may be extended to include the condition when signals arising out of this determination may be employed to direct the travel of a missile so that it follows a beam of radio frequency energy sent out in a specific direction from one locality.

Accordingly it is an object of the present invention to provide a locator system capable of determining the angular position of one locality with respect to a reference direction established by and from another locality.

Another object of the present invention is to provide a control system which will enable a controlled missile to follow a selected path established with respect to a transmitting locality.

Another object of the present invention is to provide sensing apparatus of the foregoing type having a highly accurate "sensing" ability unaffected by variations in tube characteristics.

Other and further objects and features of the present invention will become apparent upon a careful consideration of the following detailed description and the accompanying drawings in which:

FIG. 1 shows partly in block form, direction finder signal generator apparatus constructed in accordance with the teachings of the present invention;

FIG. 2 shows partly in block form, signal receiving apparatus embodying in part the teachings of the present invention;

FIG. 3 is an illustration of field pattern sum and difference combinations employed in the present invention;

FIG. 4 is an alternate manner of connecting a direction indicator to the output signal paths of the receiver system;

FIG. 5 shows details of a typical switching mechanism employed in block 15 of FIG. 1;

FIG. 6 shows details of a typical switching mechanism employed in block 24 of FIG. 2.

In accordance with the fundamental teachings of the present invention a radio direction finding system is provided which is intended primarily for determining the position of one locality with respect to a direction from another locality. For purposes of illustration, this is accomplished by providing at a transmitting locality a pair of slightly divergent beams of energy, substantially continuously emitted, with alternation at a rapid rate between conditions of phase equality between both beams and phase opposition between both beams. A single transmitter is employed and the relative phase variation is accomplished as near dual transmitting antennas as possible in order to minimize phase differences introduced by variations in the length of signal transmission path from the transmitter to each antenna. Energy radiated is received by a single receiving antenna system, and amplified, to obtain signals which are alternately in sum and difference relationship. The difference signals, obtained when transmission is with phase opposition, are zero when the receiving antenna is off the beam by a large angle (e.g. 90° or 180°) and when the antenna is directly on the beam. The sum signals, obtained when transmission is with phase equality, are present over a considerable angle on each side of the transmitted beam axis reaching a maximum directly on the beam axis.

With particular reference now to FIG. 1 of the drawing, details of the signal generating end of the direction finding system are shown. As typified it may comprise a continuously operative transmitter or oscillation generator 10 and a pair of antennas 11, 12 connected thereto. Antennas 11 and 12 which must be close together preferably radiate through a common aperture. They are of a highly directive nature providing narrow beams of energy which are slightly divergent with respect to a central axis 13.

Antenna 11 receives energy direct from transmitter 10 whereas antenna 12 receives energy alternately direct from transmitter 10 or through a 180° phase alternation device 14 as controlled at a selected rate by switch 15. Thus if a continuous wave (C.-W.) signal is employed, the energy beam 16 will be emitted steadily whereas the energy beam 17 will alternate from a condition of being in phase with the energy of beam 16 or in inverse phase relationship thereto. In this manner energy from the two antennas will periodically cancel or reenforce along the axis 13 while off the axis 13, less complete cancellation will occur. The antennas 11 and 12 may be fixed in position, continuously emitting energy in a selected direction or may be provided with rotation to cover all directions.

Receiving equipment as indicated in FIG. 2 comprises a single receiving antenna system 18 which can have directional or non-directional characteristics. Actually either type antenna would work satisfactorily, however, in certain instances it may be desirable to employ a receiving antenna 18 which possesses directive characteristics to reduce noise or interference from other signal sources in undesired directions.

Signals picked up by antenna 18 are supplied to a conventional radio frequency amplifier 19 before application to the mixer 20. In mixer 20 received signals are combined in conventional superheterodyne fashion with an oscillation from local oscillator 21 to obtain an intermediate frequency signal suitable for amplification by wide band intermediate frequency amplifier 22. Amplifier 22 has rather wide band characteristics being at least twice the transmitter pattern switching frequency typically of the order of 2 megacycles.

Output signals from amplifier 22 are applied in parallel to a detector 23 and an electronic switch 24. Electronic switch 24 may comprise a pair of alternately gated amplifier circuits responsive to detector output signals delivered through amplifier 25 to divert the signals from wide band amplifier 22 alternately to first and second integrating means or signal paths such as the narrow band intermediate frequency amplifiers 26, 27. When large amplitude signals are present in the wide band amplifier 22, typically when the energy in both transmitter patterns 16 and 17 (FIG. 1) is in phase and therefore additive detector output signals will cause electronic switch 24 to deliver signals from amplifier 22 to narrow band intermediate frequency amplifier 26. On the other hand when amplifier 22 has medium or small amplitude signals, as with out-of-phase transmission in patterns 16, 17 when the receiver is on or near axis 13, what signals are present will be delivered to narrow band intermediate frequency amplifier 27. This alternation takes place in synchronism with the operation of switch 15, hence signals for sum transmission will always be received by amplifier 26 whereas signals for difference transmission will be received by amplifier 27.

Amplifiers 26 and 27 are constructed so as to have a bandwidth substantially less than twice the frequency represented by the switching rate of switch 15, hence the square wave modulation from one pattern to the other is suppressed and the outputs therefrom appear as substantially continuous waves (C.-W.).

The continuous wave signals in the amplifiers 26 and 27 may be in-phase or out-of-phase or amplifier 27 may have no signals at all depending upon the position of the receiver system in the pattern of the antenna beams 16 and 17 of FIG. 1.

Signals combined in a sum (in-phase) manner will be relatively constant over a fairly wide range of receiver position variation each side of the transmitter antenna pattern center line 13 and may be taken as signals of a reference phase. This condition is indicated in FIG. 3 by the fan-shaped response pattern 30.

Signals combined in a difference (out-of-phase) manner will vary considerably for small angular variations of the receiver to either side of the antenna pattern center line 13, and are even in reverse phase on opposite sides of the antenna beam center 13. These difference signals are at zero amplitude on the beam center 13. The small patterns 31 and 32 of FIG. 3 indicate the response obtained with "difference" combination. Response in one of the "difference" patterns (31 for example) will have the same phase as the "sum" pattern 30 whereas the other "difference" pattern (32) will be in opposite phase relationship.

This phase and amplitude variation of the difference signals is utilized by the phase sensitive detector 28 to derive output signals proportional to the angular displacement of the receiver from the transmitter beam center 13 relative to transmitter location. Presentation of this information is given on indicator 29. Alternately as in FIG. 4 the signals from amplifiers 26 and 27 may be applied directly to perpendicularly disposed deflection axes of a cathode ray tube indicator 29, to indicate directly by deflection of the cathode ray tube beam, phase and amplitude relationships between the signals in amplifiers 26 and 27.

To improve operation of the overall system, simple automatic volume control may be employed. With such an A.V.C. system, a signal amplitude dependent control voltage derived and integrated in conventional manner by detector 23 is supplied to vary the amplification of any one or combination of the RF amplifier 19, mixer 20 and wide band intermediate frequency amplifier 22. A.V.C. thus applied can render the signal given by the indicator 29 of FIG. 2 practically constant substantially independent of variations in input signal amplitude over wide ranges, proportional only to angle of the receiver location with respect to the transmitter axis 13. For this reason it is desirable that the A.V.C. time constants be sufficiently long to prevent A.V.C. control variation at the switching rate of switch 15.

It should be noted that with an indicator of the type shown in FIG. 4 A.V.C. is not essential because the angle of signal presentation will remain constant regardless of amplitude variations. It is only where the phase sensitive detector (28 FIG. 1) is a difference measuring device and not a true ratio measuring device that good A.V.C. is desired.

In some applications, the signal from detector 23 which is applied to amplifier 25 may actually be an A.V.C. voltage which is derived by circuits having fast response permitting a following of the switching rate of transmitter switch 15.

To assist in the understanding of the present invention, details of a typical switch 15 have been shown in FIG. 5. In this figure the entire energy paths from transmitter 10 to antennas 11 and 12 have been indicated. The lines therein are intended to indicate a waveguide system in cross-section. Energy is applied to the waveguide system at the point indicated by numeral 35. Energy divides at point 36, part of it going direct to antenna 11, the rest going through a pair of parallel paths to antenna 12. Energy going to antenna 12 divides at point 37, going either through the upper path 38 or the lower path 39 under control of the gas-tube switches 40, 41.

Gas-tube switches 40, 41 are of the ionization type such as the transmit-receive switches commonly employed in radar and comprise a resonant cavity having dielectric windows. In the cavity, a discharge takes place under control of a signal applied to the "keep-alive" electrodes 42, 43. When ionized these switches become effective short circuits. Take for example the tube 40. When this tube is ionized, it is effectively a short circuit. The distance from tube 40 to point 37 is an even multiple of a quarter wavelength long, hence it appears as a short circuit across branch 38 to direct energy through branch 39.

Similarly ionization of tube 41 is reflected through a path from tube 41 to point 37 which is also an even multiple of a quarter wavelength to appear at point 37 as a short circuit across branch 39 and deliver energy through branch 38.

The distance between the combining junction point 44 and each of the gas tubes 40, 41 in the respective branches is an even multiple of a quarter wavelength so that the branch containing the ionized tube will also appear as a short circuit at point 44.

To provide the 180° phase alternation indicated in FIG. 1 by the block of reference character 14, an additional path 45 which is preferably an odd multiple of a half wavelength is added. Thus the energy delivered through branch 39 is 180° out of phase with respect to that delivered through branch 38.

When originally set up the length of path from point 36 through the direct path to antenna 11 may be selected to produce in-phase condition with the energy delivered through branch 38 to antenna 12.

Switching of the voltages to the keep-alive electrodes 42, 43 in an alternate manner is accomplished by the free-running multivibrator of tubes 46, 47. In this type multivibrator either tube 46 or 47 is conductive. Thus the anode of one tube will be up in potential while the other is down, conditions which will alternate at a high rate of speed. By virtue of the return of the cathodes to a negative potential, the potential at the anode of a conductive tube (such as 46) is near zero. With the entire waveguide assembly grounded for direct current there is thus practically no keep-alive voltage across tube 41. At this same time, absence of conduction by tube 47 places a high potential (near B+) across tube 40 to produce the required ionization. As a protective measure, the current limiting resistances 48 and 49 are inserted serially in the leads from the anodes of the tubes 46 and 47 to the "keep-alive" electrodes 43 and 42.

Details of the switch 24 are shown in FIG. 6. This switch includes a clipper-limiter sequence of tubes 50, 51, 52 receiving signals from the amplifier 25 of FIG. 1 at terminal 56 and possessing sufficient amplification such that signals of the smallest usable difference in amplitude between the sum and difference patterns will still receive limiting between the two extremes at the anode 53 of tube 51. Tube 52 then becomes an inverter to invert the limited signal appearing at anode 53, not to provide additional limiting.

Tube 50 is biased as an amplifier, that is the biasing voltage therefor is somewhat between zero and cut-off. Signals amplified by tube 50 and applied to tube 51 are of sufficient amplitude to cause grid current flow in tube 51 with consequent charging at the coupling capacitance 54 on positive signals. During following negative (or lower) portion of a square wave tube 51 is cut-off producing therefore anode current conditions altering between cut-off and saturation.

In a similar manner, tube 52 receiving signal from the anode 53 is driven between saturaiton and cut-off to produce limited output signals at the anode 55 inverted with respect to the signal at the anode 53.

Signals from the anodes 53 and 55 are applied to the suppressor grids 57 and 58 respectively of the pentode type electron tubes 59 and 60. Tubes 59 and 60 also receive at their control grids 61 and 62 input signals from the wide band intermediate frequency amplifier 22 as applied to terminal 63. Tubes 59 and 60 are alternately rendered responsive to signals from terminal 63 by the varying voltages supplied to the suppressor grids from the anodes 53 and 55 so that input signals from terminal 63 appear alternately across the load and output coupling circuits 64, 65 for delivery to the narrow band intermediate frequency amplifiers 26 and 27 of FIG. 1.

This system may be a part of a missile control system of a very effective and simple type. For such a system, the transmitter system of FIG. 1 is located at the control point and the antenna system is oriented so that the antenna beam axis is directed along a line of flight which it is desired for the missile to follow toward a distant target. The output of the phase sensitive detector 28 of FIG. 2 is applied to control circuits 66 which through suitable control linkage may adjust the control surfaces of the missile to cause it to follow a particular path with respect to antenna beam axis 13, typically along the axis 13.

The principles of the present invention have been shown and described, with a system capable of operating in just one plane, typically a horizontal plane, give right-left indication and control. For certain types of operation such a simple system is not entirely satisfactory. Such a type would be where the receiver locality is airborne requiring some form of elevation sensing and control. Since the entire apparatus of the present invention is comparatively simple and requires relatively small amounts of power, another complete system as here shown, having the antennas 11 and 12 divergently radiating in a vertical plane rather than horizontal could be added.

In the overall system an illustrative set of values of frequencies and bandwidths might be the following:

Radio frequency _____megacycles per second__ 300
Intermediate frequency _____do__ 20
Switching frequency _____do__ 1
Wide I.F. bandwidth (22) _____do__ 2
Narrow I.F. bandwidth (26, 27) _____do__ 0.2
Long time stability of receiver L.O. and transmitter _____perent__ .005

Although certain specific embodiments of this invention have been disclosed and described it is to be understood that they are merely illustrative of this invention and modifications may, of course, be made without departing from the spirit and scope of the invention as defined in the appended claims.

What is claimed is:

1. In a direction finding system, a signal source providing radiant energy release in slightly divergent overlapping patterns, means within said source alternately reversing the phase of the radiant energy in one pattern, a remote signal receptive device, first and second signal paths, received signal responsive switch means delivering signals from the signal receptive device to the first signal path when the radiated energy patterns are in-phase and to the second signal path when the radiated energy patterns are out-of-phase, and phase responsive utilization apparatus connected to the signal paths responsive to produce output signals in dependency on relative phase and amplitudes of the signals in said paths.

2. In a direction finding system, a signal source providing radiant energy release in two slightly divergent overlapping patterns, means within said signal source alternately reversing the phase of the radiant energy in one pattern, a remote signal receptive device for receiving said radiant energy release, comprising, first and second integrating means, means responsive to the received signals deriving control signals during reception of in-phase signals from the transmitter, an electronic switching device responsive to the control signals operative to deliver received signals from the receptive device to said first integrating means during the control signals and to the second integrating means in the absence of control signals, and utilization means coupled to the output of the first and second integrating means.

3. In a direction finding system, an energy source, a phase reversing signal path connected to the energy source, first and second energy radiators providing radiant energy release in slightly divergent overlapping patterns, means connecting the first energy radiator to the energy source, means delivering energy from the energy source to the second energy radiator with rapid alternation between a first condition of directly and a second condition of indirectly through the phase reversing signal path, a remote signal reception device for receiving said radiant energy release, comprising, first and second integrating means, means responsive to the received signals deriving control signals during reception of in-phase signals from the transmitter, an electronic switching device responsive to the control signals operative to deliver received signals from the receptive device to a first integrating means during the control signals and to the second integrating means in the absence of control signals, and utilization means coupled to the output of the first and second integrating means.

4. In a direction finding system, a signal source, phase alteration means reversing the phase of a part of the energy from said signal source, first and second energy radiators providing radiant energy release in slightly divergent overlapping patterns, a signal path supplying energy from the signal source to the first energy radiator, a switch alternately supplying the second energy radiator with energy from the signal source directly and from the phase alteration means, a remote signal receptive device for receiving said radiant energy release, comprising, first and second integrating means, means responsive to the received signals deriving control signals during reception of in-phase signals from the transmitter, an electronic switching device responsive to the control signals operative to deliver received signals from the receptive device to a first integrating means during the control signals and to the second integrating means in the absence of control signals, and utilization means coupled to the output of the first and second integrating means.

5. In a direction determining system, a signal source providing radiant energy release in two slightly divergent overlapping patterns, means within said signal source alternately reversing the phase of the radiant energy in one pattern, a remote signal receptive device for receiving said radiant energy release, comprising, amplifier means responsive to signals picked up by the signal receptive device, first and second signal integrating paths, switching means connected to the output of the amplifier means responsive to deliver large amplitude amplified signals to one integrating signal path and small amplitude signals to a second integrating signal path, and signal comparing means connected to the signal integrating paths.

6. In a direction control system for a movable object having direction of travel control mechanism, a signal source providing radiant energy release in two slightly divergent overlapping patterns of energy beams, means within said signal source alternately reversing the phase of the radiant energy in one pattern, a remote signal receptive device for receiving said radiant energy release, comprising, amplifier means responsive to signals picked up by the signal receptive device, first and second signal integrating paths, switching means connected to the output of the amplifier means responsive to deliver large amplitude amplified signals to one integrating signal path and small amplitude signals to a second integrating signal path, signal comparing means connected to the signal integrating paths, and control signal paths linking the signal comparing means with the direction of travel control mechanism to adjust the direction of travel of the movable object along the radiant energy beams.

7. In a direction finding system, a signal source providing radiant energy release in slightly divergent overlapping patterns, means within said source alternately reversing the phase of the radiant energy in one pattern with respect to the energy of the other pattern, and a remote signal receptive device including phase comparison means for comparing the phase of the received signals obtained during both pattern phase conditions to determine the location of the signal receptive device with respect to the energy patterns.

8. In a direction finding system, a signal source providing radiant energy release in slightly divergent overlapping patterns in phase synchronism and in phase opposition alternatively, and a remote signal receptive device including phase comparison means for comparing the phase of the received signals obtained during both pattern phase conditions to determine the location of the signal receptive device with respect to the energy patterns.

9. In a direction finding system including a signal source providing radiant energy release in slightly divergent overlapping patterns in phase synchronism and in phase opposition alternately, a remote signal receptive device for receiving said radiant energy release comprising first and second signal paths, received signal responsive switch means delivering signals from the signal receptive device to the first signal path when the radiant energy patterns are in phase and to the second signal path when the radiant energy patterns are out of phase, and phase responsive utilization apparatus connected to the signal paths responsive to produce output signals in dependency on the relative phase and amplitude of the signals in said paths.

10. In a direction finding system including a signal source providing radiant energy release in slightly divergent overlapping patterns first in phase synchronism and then in phase opposition alternately, a remote signal receptive device for receiving said radiant energy release comprising a first signal translation path for translating the signals received during the in phase pattern condition, a second signal translating path for translating the signals received during the out of phase pattern condition, and a phase comparison means for comparing the phase of the signals translated by said first and second translation paths to determine the location of the signal receptive device with respect to the energy patterns.

References Cited
UNITED STATES PATENTS

| | | | |
|---|---|---|---|
| 2,107,155 | 2/1938 | Kleinkauf et al. | 343—107 |
| 2,176,469 | 10/1939 | Moueix | 343—100 |
| 2,400,736 | 5/1946 | Brown | 343—101 |
| 2,414,791 | 1/1947 | Barrow | 343—107 |
| 2,438,987 | 4/1948 | Bailey | 343—107 |
| 2,513,493 | 7/1950 | Kliever | 343—107 |

FOREIGN PATENTS 571,239    8/1949    Great Britain.

RODNEY D. BENNETT, *Primary Examiner.*

SIMON YAFFEE, NORMAN H. EVANS, *Examiners.*

C. L. JUSTUS, H. C. WAMSLEY, *Assistant Examiners.*